United States Patent [19]

Yokogawa

[11] Patent Number: 5,289,376

[45] Date of Patent: Feb. 22, 1994

[54] APPARATUS FOR DISPLAYING DICTIONARY INFORMATION IN DICTIONARY AND APPARATUS FOR EDITING THE DICTIONARY BY USING THE ABOVE APPARATUS

[75] Inventor: Toshihiko Yokogawa, Yokohama, Japan

[73] Assignee: Ricoh Company, Ltd., Japan

[21] Appl. No.: 615,841

[22] Filed: Nov. 20, 1990

[30] Foreign Application Priority Data

Nov. 20, 1989 [JP] Japan .................................. 1-301776

[51] Int. Cl.⁵ .............................................. G06F 15/40
[52] U.S. Cl. .................................................. 364/419.11
[58] Field of Search ........................................ 364/419

[56] References Cited

U.S. PATENT DOCUMENTS

| 4,724,523 | 2/1988 | Kucera | 364/419 |
| 4,805,132 | 2/1989 | Okamoto et al. | 364/419 |
| 4,916,614 | 4/1990 | Kaji | 364/419 |

FOREIGN PATENT DOCUMENTS 61-70660 4/1986 Japan .
62-271056 11/1987 Japan .
63-10265 1/1988 Japan .
63-136265 6/1988 Japan .
63-223871 9/1988 Japan .

Primary Examiner—Robert A. Weinhardt
Assistant Examiner—Xuona Chung
Attorney, Agent, or Firm—Mason, Fenwick & Lawrence

[57] ABSTRACT

An apparatus for displaying dictionary information in a dictionary used in a natural language process, the dictionary having a plurality of entry words, small categories corresponding to each entry word and the dictionary information belonging to each small category, each small category being a syntactic category of a corresponding entry word. The apparatus includes a retrieval unit for retrieving the entry word specified by a user in the dictionary and reading out the dictionary information belonging to each small category corresponding to the retrieved entry word from the dictionary, a grouping unit for grouping the small categories corresponding to the retrieved entry word into medium categories, each medium category having one or a plurality of small categories, and a display unit for displaying the dictionary information in the small categories grouped in each medium category.

13 Claims, 10 Drawing Sheets

| MEDIUM CATEGORY | SMALL CATEGORY |
|---|---|
| VERB USED WITHOUT COMPLEMENT AND OBJECT | Vi1 , Vi2 |
| VERB USED WITH COMPLEMENT AND WITHOUT OBJECT | Vi3, Vic, Vi5, Via |
| VERB USED WITH NOUN OBJECT AND WITHOUT COMPLEMENT | Vt1, Vtn, Vt2 |
| VERB USED WITH PARTICLE AS OBJECT | Vtg , Vtp |
| VERB USED WITH CLAUSE AS OBJECT | Vts , Vtq |
| VERB USED WITH DOUBLE OBJECTS | Vd2, Vd1, Vd3 |
| VERB USED WITH COMPLEMENT AND NOUN OBJECT | Vt2 , Vts |
| TRANSITIVE VERB USED WITH SEPARATED ADVERBIAL MINOR TERM | Vt3 |
| VERB USED WITH PARTICIPLE AS COMPLEMENT | Vig , Vip |
| ------ | ------ |

FIG. 3

| ENTRY | LAGE CATEGORY | SMALL CATEGORY | JAPANESE EQUIVALENT | RELATED INFORMATION |
|---|---|---|---|---|
| --- | --- | --- | --- | --- |
| make | V | Vt1 | TSUKURU | 5DAN·~ WO --- |
| | | | SYOJISASERU | 1DAN·~ WO --- |
| | | | SURU | SAHEN~ WO --- |
| | | | ERU | 1DAN·~ WO --- |
| | | Vi1 | FURUMAU | 5DAN·--- |
| | | | MISEKAKERU | 1DAN·--- |
| | | | TSUKURARERU | 1DAN·--- |
| | | Vi2 | MUKAU | 5DAN·--- |
| | | | SUSUMU | 5DAN·--- |
| | | Vi3 | NARU | 5DAN·~ NI |
| | | Vic | NARU | 5DAN·RENYOKEI-- |
| | | | SURU | SAHEN·RENYOKEI-- |
| | | Vd3 | MISERU | 1DAN·A WO B NI -- |
| | | | YOISURU | SAHEN·A WO B NI-- |
| | | | TOTONOERU | 1DAN·A WO B NI--- |
| | | Vt2 | MISERU | 1DAN·A WO B NI--- |
| | | | HYOGENSURU | 1DAN·A WO B TO--- |
| | | | MINASU | 1DAN·A WO B TO--- |
| | | Vt4 | SURU | SAHEN·B WO A NI--- |
| | | Vt5 | SASERU | |
| | | Vts | | |
| | | ---- | | |
| | --- | --- | --- | --- |
| --- | --- | --- | --- | --- |

FIG. 4

| MEDIUM CATEGORY | SMALL CATEGORY |
|---|---|
| VERB USED WITHOUT COMPLEMENT AND OBJECT | Vi1, Vi2 |
| VERB USED WITH COMPLEMENT AND WITHOUT OBJECT | Vi3, Vic, Vi5, Via |
| VERB USED WITH NOUN OBJECT AND WITHOUT COMPLEMENT | Vt1, Vtn, Vt2 |
| VERB USED WITH PARTICIPLE AS OBJECT | Vtg, Vtp |
| VERB USED WITH CLAUSE AS OBJECT | Vts, Vtq |
| VERB USED WITH DOUBLE OBJECTS | Vd2, Vd1, Vd3 |
| VERB USED WITH COMPLEMENT AND NOUN OBJECT | Vt2, Vts |
| TRANSITIVE VERB USED WITH SEPARATED ADVERBIAL MINOR TERM | Vt3 |
| VERB USED WITH PARTICIPLE AS COMPLEMENT | Vig, Vip |
| ------ | ------ |

FIG. 5

| | |
|---|---|
| VERB USED WITHOUT COMPLEMENT AND OBJECT | MANAGEMENT NUMBER:2<br>POINTER FOR Vi1<br>POINTER FOR Vi2 |
| VERB USED WITH COMPLEMENT AND WITHOUT OBJECT | MANAGEMENT NUMBER:2<br>POINTER FOR Vi3<br>POINTER FOR Vic |
| VERB USED WITH NOUN OBJECT AND WITHOUT COMPLEMENT | MANAGEMENT NUMBER:2<br>POINTER FOR Vt1<br>POINTER FOR Vt2 |
| VERB USED WITH PARTICIPLE AS OBJECT | MANAGEMENT NUMBER:0 |
| VERB USED WITH CLAUSE AS OBJECT | MANAGEMENT NUMBER:0 |
| VERB USED WITH DOUBLE OBJECTS | MANAGEMENT NUMBER:2<br>POINTER FOR Vd2<br>POINTER FOR Vd3 |
| VERB USED WITH COMPLEMENT AND NOUN OBJECT | MANAGEMEN NUMBER:1<br>POINTER FOR Vt4 |
| ----- | ------ |

FIG. 8

| DESCRIPTION OF A PART OF SPEECH | JAPANESE EQUIVALENT |
|---|---|
| VERB USED WITHOUT COMPLEMENT AND OBJECT | FURUMAU MISEKAKERU TSUKURARERU |
| VERB USED WITH COMPLEMENT AND WITHOUT OBJECT | NARU SURU |
| VERB USED WITH NOUN OBJECT AND WITHOUT COMPLEMENT | TSUKURU SYOJISASERU ---- |
| VERB USED WITH DOUBLE OBJECTS | MISERU HYOGENSURU ---- |
| VERB USED WITH COMPLEMENT AND NOUN OBJECT | SURU ---- |

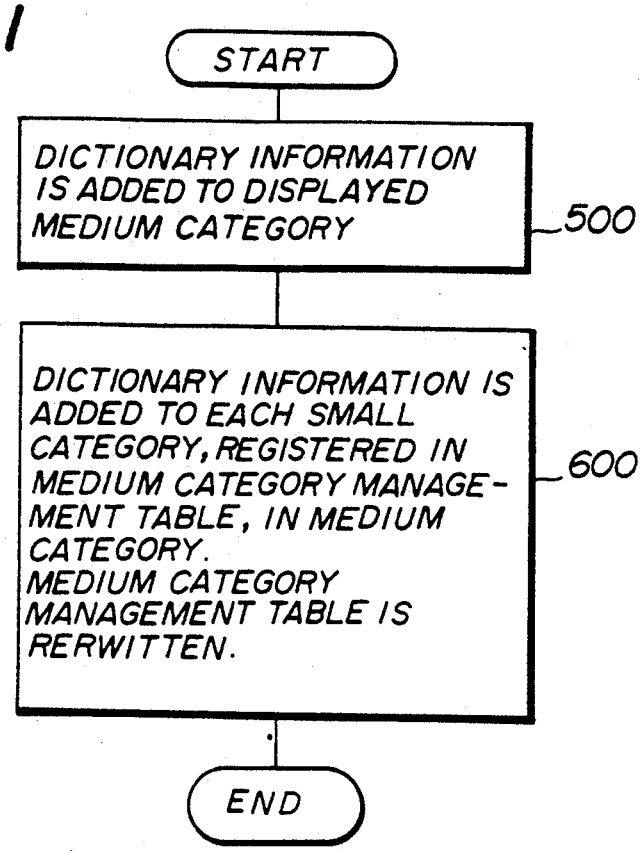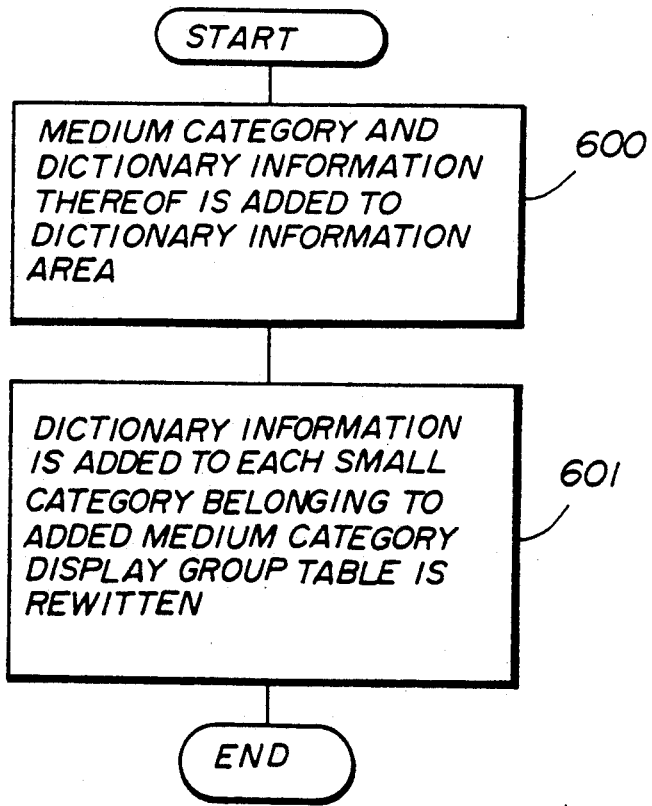

APPARATUS FOR DISPLAYING DICTIONARY INFORMATION IN DICTIONARY AND APPARATUS FOR EDITING THE DICTIONARY BY USING THE ABOVE APPARATUS

BACKGROUND OF THE INVENTION

The present invention generally relates to an apparatus for displaying dictionary information in a dictionary used in a natural language process and an apparatus for editing a dictionary by using the above apparatus, and more particularly to an apparatus for displaying dictionary information and an apparatus for editing a dictionary used in a natural language process which is performed in a machine translation system, a database retrieval system, an artificial intelligence system and so on.

In a natural language process, a structure of a natural language sentence is parsed based on grammar and dictionary information. That is, the structure of the natural language sentence is converted into a structure which can be recognized by a system such as the machine translation system. An apparatus for editing the dictionary used in the natural language process is, for example, called a dictionary editor. The dictionary editor edits the dictionary so that the result of the natural language process is that desired by a user. When the dictionary editor edits the dictionary, first the contents in the dictionary are displayed on a display unit. Then the user looks at the display unit and supplies instruction information to modify the dictionary, add dictionary information to the dictionary or delete dictionary information from the dictionary. After this, the dictionary editor modifies the dictionary in accordance with the user's instructions. As a result, it is possible to make a system such as the machine translation system which is capable of outputting the information wanted by the user.

In conventional dictionary editors as disclosed in Japanese Laid-Open Patent Application Nos. 61-70660, 63-10265, 63-136265, 63-223871, the entire contents of the dictionary are displayed on the display unit.

Recently, for example, in the machine translation system, the amount of the contents in the dictionary has been enlarged in order to accurately parse the sentence. That is, the part of speech of each word is further divided into numerous categories. For example, a part of speech "verb" is divided into numerous categories, such as "verb used with an adjective as a complement", "verb used with a noun as a complement" and so on.

Accordingly, if the entire contents of the dictionary are displayed on the display unit, as described above in the case of the conventional dictionary editor, the contents of the numerous categories corresponding to one word are displayed, so that it is difficult for the user to determined whether or not the contents of each category are desired.

On the other hand, when only the contents of the part of speech of each word are displayed on the display unit and the contents of the part of speech are modified, it is difficult to edit the dictionary enough to be able to accurately parse the sentence. For example, in a case where there is no information relating to a category "incomplete intransitive verb" so that the information desired by the user is not obtained, even if information relating to a simple category "verb" is indicated to the user, it is difficult for the user to understand the reason why the information desired by the user can not be obtained.

In addition, Japanese Laid-Open Patent Application No. 62-271056 discloses a dictionary editor in which, first, the information relating to the part of speech is indicated to the user, and second, information in numerous categories relating to the part of speech ar indicated. The above dictionary editor also has the same first problem arising in the case where information in numerous categories is displayed on the display unit and the second problem maintained above arising the case where information on a simple part of speech is displayed on the display unit, as has been described above.

The part of speech of a word is called a morphological category. A category of the word which is used in the natural language process is called a syntactic category. That is, the sentence is parsed based on the syntactic category. In this case, the morphological category is formed of numerous syntactics categories.

SUMMARY OF THE INVENTION

Accordingly, a general object of the present invention is to provide a novel and useful apparatus for editing a dictionary used in a natural language process, in which the disadvantages of the aforementioned prior art are eliminated.

A more specific object of the present invention is to provide an apparatus for displaying dictionary information in a dictionary used in a natural language process, in which it is easy for the users to look for the displayed dictionary information.

The above objects of the present invention are achieved by providing an apparatus for displaying dictionary information in a dictionary used in a natural language process, the dictionary having a plurality of entry words, small categories corresponding to each entry word and the dictionary information belonging to each small category, each small category being a syntactic category of a corresponding entry word, the apparatus comprising: retrieval means for retrieving the entry word specified by a user in the dictionary and reading out the dictionary information belonging to each small category corresponding to the retrieved entry word from the dictionary; grouping means for grouping the small categories corresponding to the retrieved entry word into medium categories, each medium category having one or a plurality of small categories; and display means, coupled to the grouping means, for displaying the dictionary information in the small categories grouped in each medium category.

Another specific object of the present invention is to provide an apparatus for editing dictionary used in natural language, in which it is easy for the users to understand a state of the dictionary and it is possible to accurately modify the dictionary.

The above objects of the present invention are achieved by providing an apparatus for editing a dictionary used in a natural language process, the dictionary having a plurality of entry words, small categories corresponding to each entry word and the dictionary information belonging to each small category, each small category being a syntactic category of a corresponding entry word, the apparatus comprising: retrieval means for retrieving the entry word specified by a user in the dictionary and reading out the dictionary information belonging to each small category corresponding to the retrieved entry word from the dictionary; grouping means for grouping the small categories corresponding to the retrieved entry word into medium categories, each medium category having one or a plurality of small categories; display means, coupled to the grouping means, for displaying the dictionary information in the small categories grouped in each medium category; modification means for modifying the dictionary information displayed by the display means in accordance with the user's instruction; and renewal means for renewing the dictionary information in the dictionary on the basis of the dictionary information obtained by the modification means.

Additional objects, features and advantages of the present invention will become apparent from the following detailed description when read in conjunction with accompanying drawings.

BRIEF DESCRIPTION OF DRAWINGS

FIG. 3 shows an example of a structure of the dictionary shown in FIG. 1;

FIG. 4 shows an example of a structure of the display group table shown in FIG. 1;

FIG. 5 shows an example of a structure of the medium category management table;

FIG. 8 shows an example of contents of information displayed on the display unit; and FIGS. 9 through 12 are flow charts showing processes for editing the dictionary.

DESCRIPTION OF THE PREFERRED EMBODIMENTS

A description will now be given of an embodiment of the present invention with reference to the accompanying drawings.

Figure 1:
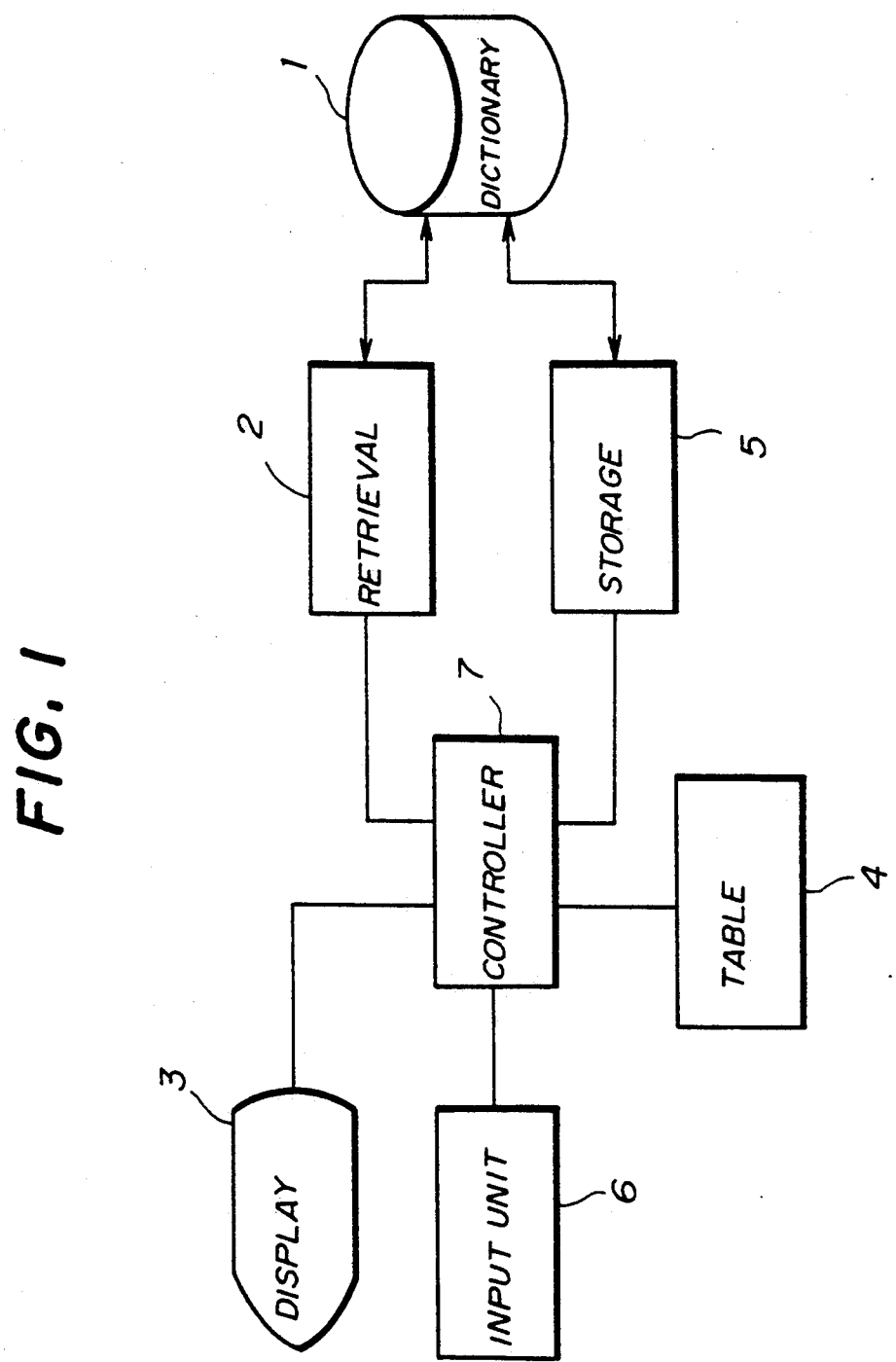
FIG. 1 is a block diagram showing a dictionary editor according to an embodiment of the present invention.

FIG. 1 shows a basic structure of a dictionary editor.

Referring to FIG. 1, the dictionary editor edits a dictionary 1 used in a natural language process and has a dictionary retrieving block 2, a display unit 3 such as a CRT display or an LCD display, a display group table 4, a dictionary storage block 5, an input unit 6 such as a key board or an optical character reader (OCR), and a controller 7. The dictionary editor is, for example, used in a English-Japanese machine translation system. The controller 7 and the dictionary retrieving block 2 are generally formed of computer device hardware and software. The display group table 4 and the dictionary storage block 5 are respectively formed of memories. When a user inputs an entry (word) from the input unit 6, the dictionary information corresponding to the entry is read out from the dictionary 1 and then the dictionary information is displayed on the display unit 3. The dictionary information displayed on the display unit 3 will be described latter. When the user looks at the dictionary information displayed on the display unit 3 and inputs instructions from the input unit 6, the dictionary information is modified in accordance with the user's instructions. Then the modified (edited) dictionary information corresponding to the entry is stored in the dictionary storage block 5. After that, the dictionary information output from the dictionary storage block 5 is stored in the dictionary 1.

A detailed description will now be given of a process for editing the dictionary with reference to FIG. 2. The process is mainly performed in the controller 7.

Figure 2:
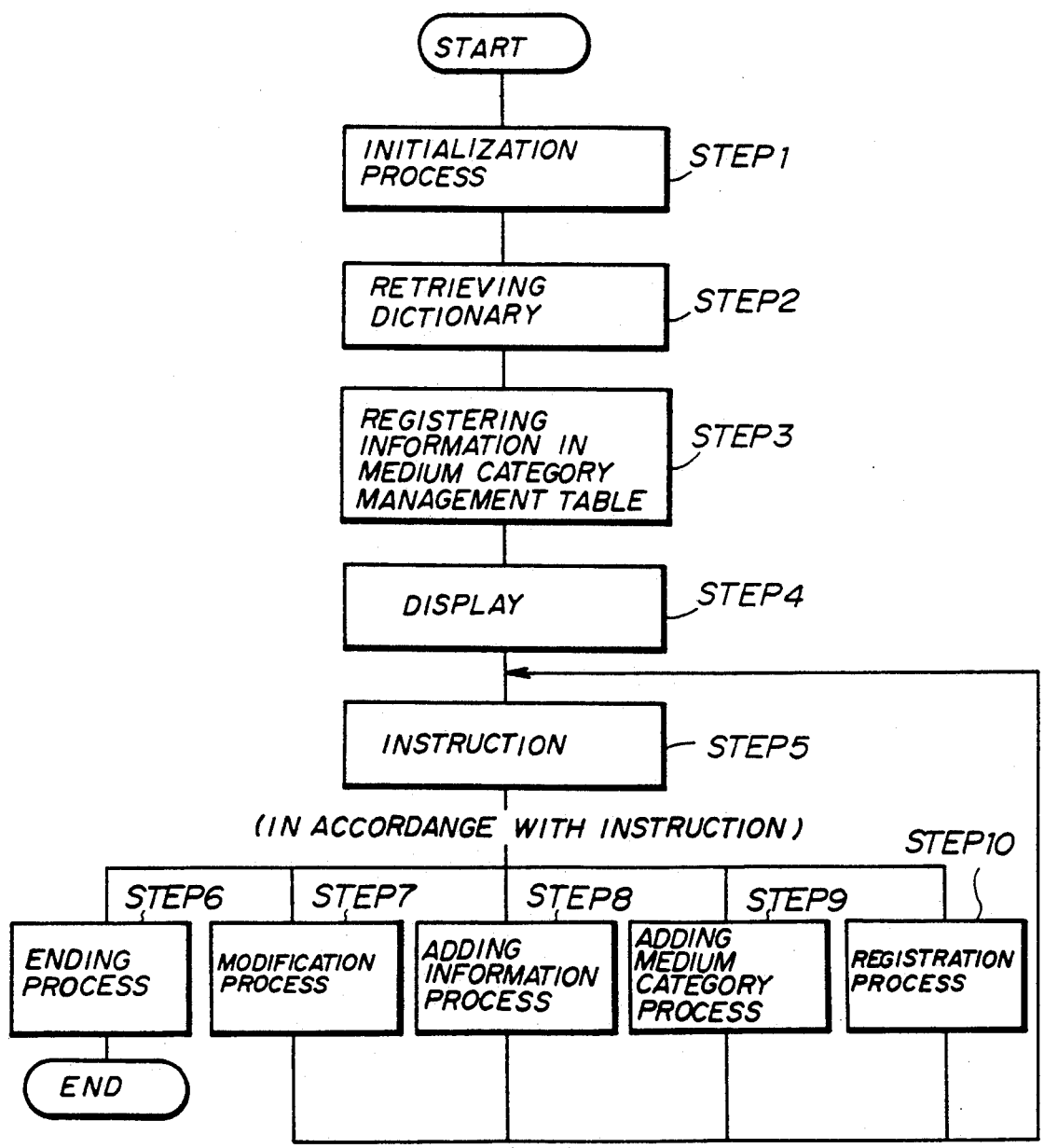
FIG. 2 is a flow chart showing a process for editing the dictionary shown in FIG. 1.

Referring to FIG. 2, steps 1 through 10 are successively performed in the process. A description will be given of the process for each step.

Initialization process (step 1 shown in FIG. 2):

The dictionary editor is initialized. A process for initializing the dictionary editor will be described later.

Retrieval of the dictionary (step 2 shown in FIG. 2):

When the dictionary editor is activated and the user inputs an entry (word) from the input unit 6, the dictionary retrieving block 2 retrieves the dictionary information, corresponding to the entry input by the user, in the dictionary 1. The dictionary information retrieved by the dictionary retrieving block 2 is stored in a dictionary information area in a memory provided in the controller 7. It is also possible to provide no dictionary information area in the memory. In this case, the controller 7 directly refers to the dictionary 1.

The contents in the dictionary 1 are, for example, shown in FIG. 3. Referring to FIG. 3, each entry which is an English word, such as "make", has one or plurality of parts of speech (morphological categories) such as "verb" denoted by "V" and so on. Each part of speech has a plurality of syntactic categories such as "first transitive verb" denoted by "Vt1", "first intransitive verb" denoted by "Vi1", "second intransitive verb" denoted by "Vi2" and so on. Each syntactic category has one or a plurality of Japanese equivalents such as "TSUKURU" which corresponds to "make" in the syntactical category "first transitive verb", "FURU-MAU" which also corresponds to "make" in the syntactical category "first transitive verb" and so on. Each syntactic category also has related information which explains how to use, for example, the Japanese equivalent in a corresponding syntactic category. That is, categories which are related to one entry form a tree structure. In this case, for example, a part of speech (morphological category) is called a large category, and a syntactic category is called a small category. In the machine translation system using the dictionary 1, the translation is performed on the basis of the contents (Japanese equivalents and related information) of the small categories.

The syntactic categories are grouped into display groups. Each display group has one or a plurality of syntactic categories (small categories). Each display group is called a medium category. A relationship between the medium categories and the syntactic categories (small categories) is represented by the display group table 4 shown in FIG. 4. Referring to FIG. 4, for example, two small categories "Vi1" and "Vi2" are grouped in the medium category "verb used without a complement and an object", four small categories "Vi3", "Vic", "Vi5" and "Via" are grouped in the medium category "verb used with a complement and without an object" and so on. That is, in FIG. 4, the syntactical functions of the small categories grouped in each medium category are similar to each other.

The Japanese equivalents and the related information of each small category which are output from the dictionary retrieving block 2 are supplied to the controller 7. With reference to the display group table 4 shown in FIG. 4, the controller 7 stores the Japanese equivalents and the related information in an area, of the dictionary information area of the memory, corresponding to the medium category in which one or a plurality of small categories having the Japanese equivalents and the related information are grouped. When there is no area corresponding to the medium category in the dictionary information area, a new area corresponding to the medium category is formed in the dictionary information area.

The display group table 4 is formed in the memory provided in the dictionary editor. It is also possible to form the medium categories, as shown in the display group table 4, in the dictionary 1. However, when the medium categories are formed in the display group table 4, the following advantages are obtained.

(1) The structure of the dictionary 1 is simplified so that the amount of data in the dictionary can be decreased.

(2) The conventional dictionary can be used without any modification.

(3) By merely changing of the scale of the medium category, it is possible for each user to easily understand the contents in the dictionary 1. For example, for users who are professional translators of the language, small-scale medium categories can be provided in the display group table 4. Each small-scale medium category has a small number of small categories. For ordinary users and beginners, large-scale medium categories can be provided in the display group table 4. Each large-scale medium category has a large number of small categories.

Initialization process:

In this embodiment, a medium category management table is constructed in the dictionary information area in the memory when the dictionary editor is activated. The medium category management table is, for example, shown in FIG. 5. The medium category management table shows the number of small categories which are managed under each medium category. The number of small categories in each medium category is called a management number. The medium category management table also shows one or a plurality of pointers, each pointer indicating the position where each small category is stored. The management number is initialized at "0". The pointer area is provided in the medium category management table so that the plurality of pointers can be managed. The pointers can be arbitrary determined. For example, the pointer area can be provided a pointer indicating an actually information area and a pointer indicating a pointer area which shows the next information. In this case, a NULL pointer represents that there is no information.

The initialization of the medium category management table is performed in step 1 of the initialization process before the dictionary retrieving block 2 retrieves the dictionary 1.

FIG. 5 shows the medium category management table having the medium categories "verb used without a complement and an object", "verb used with a complement and without an object" and so on. For example, the medium category "verb used with a complement and without an object" has the four small categories Vi3, Vic, Vi5 and Via as shown in FIG. 4. However, since there is no dictionary information relating to the small categories Vi5 and Via, in this case, the management number in the medium category "verb used with a complement and without an object" is equal to two. There are also no pointers for the small categories Vi5 and Via. In this embodiment, the dictionary information is stored in the memory in the dictionary editor to increase the processing speed. Thus, the pointer indicates the area in the memory provided in the dictionary editor. It is also possible for the pointer to indicate an area in the dictionary 1. A modification or an addition to the dictionary information is also performed on the area in the memory provided in the dictionary editor. When it is instructed by the user that the dictionary information is registered, the modified or added dictionary information is stored in the dictionary 1.

Figure 6:
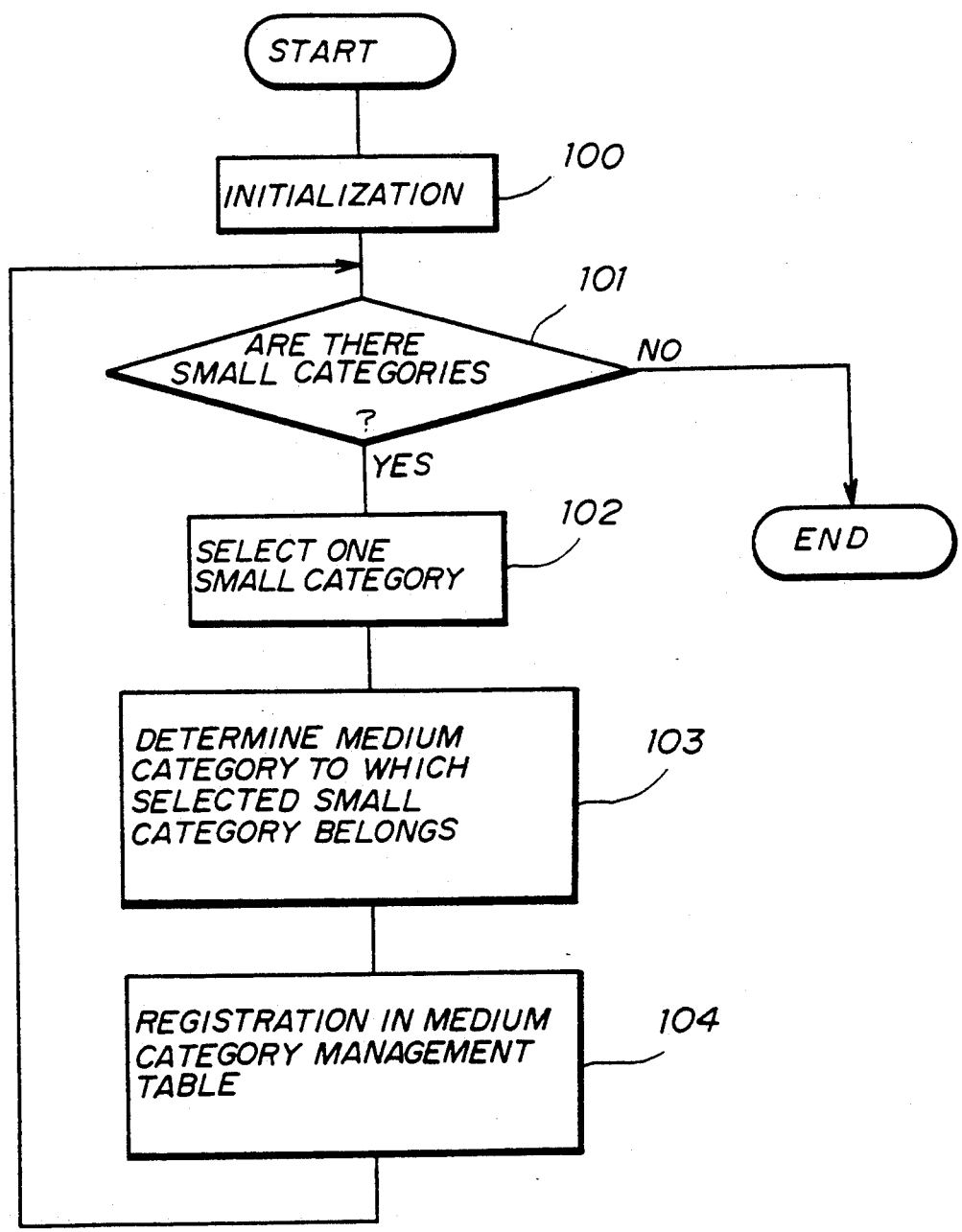
FIG. 6 is a flow chart showing a process for registering information in the medium category management table.

Registration of information in the medium category management table (step 3 shown in FIG. 2):

FIG. 6 is a flow chart showing a process for registering information in the medium category management table. First, the initialization process is performed in step 100. Then, step 101 determines whether or not there are remaining small categories which are not processed yet in the dictionary information area in the memory provided in the dictionary editor. When the result in step 101 is YES, in step 102 one small category is selected from the remaining small categories in the dictionary information area in the memory. Then, in step 103, the medium category to which the selected small category belongs is determined with reference to the display group table 4. The selected small category is registered in the above determined medium category in the medium category management table, in step 104. In step 104, the management number in the medium category in which the small category is registered is incremented by one, and then, a value of the pointer indicating the area of the small category is stored. After step 104 is completed, the process is returned to step 101.

On the other hand, if the result in step 101 is NO, the process for registering information in the medium category management table is completed.

In this embodiment, there is no small category identical to another small category. However, it is also possible to provide a small category identical to another small category.

Figure 7:
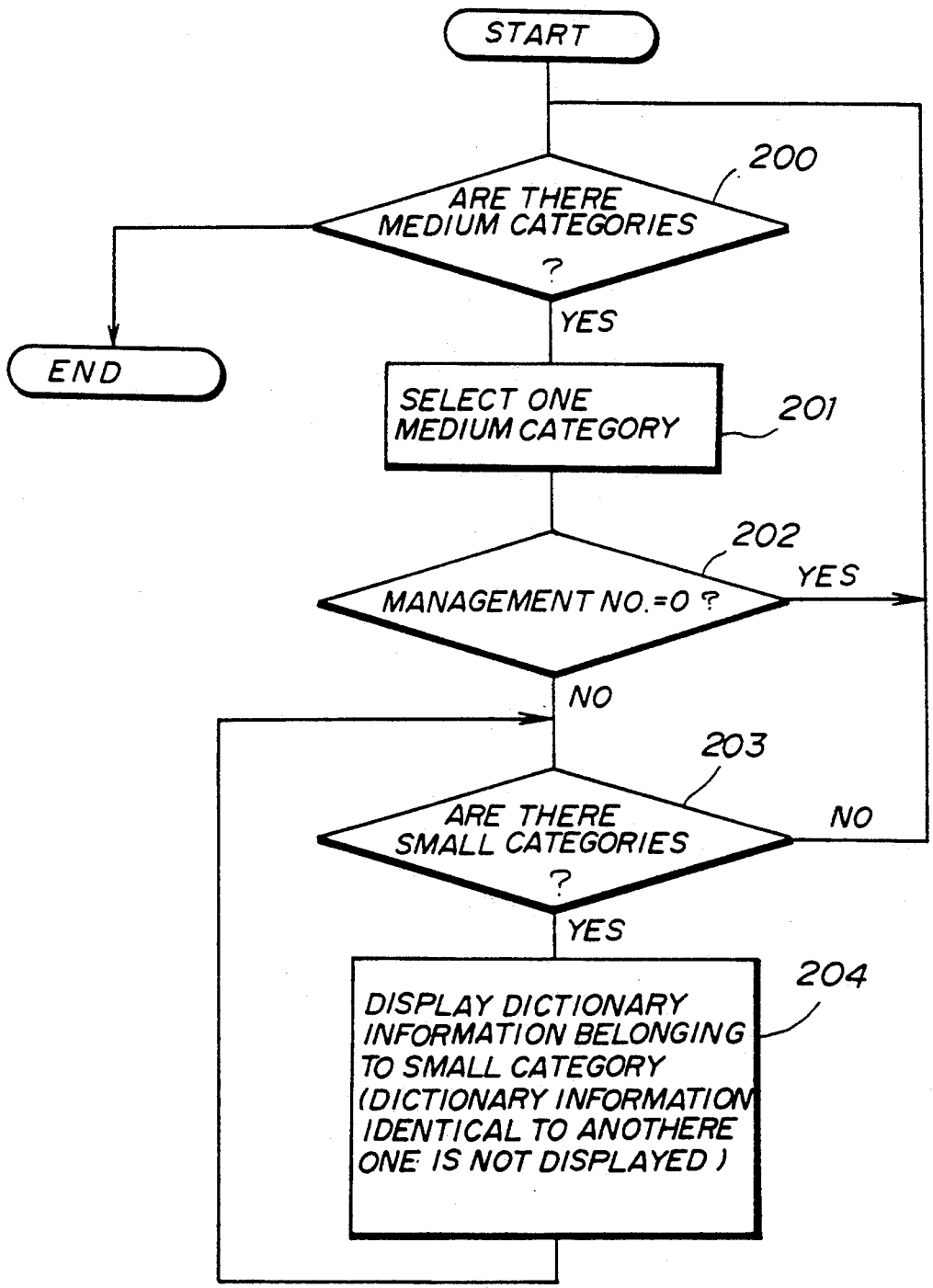
FIG. 7 is a flow chart showing a process for displaying the dictionary information.

Display (step 4 shown in FIG. 2):

The contents in each medium category are displayed on the display unit 3, in accordance with a process shown in FIG. 7.

Referring to FIG. 7, step 200 determines whether or not there is a remaining medium category which has not been processed yet in the medium category management table. When the result in step 200 is YES, one medium category is selected from the remaining medium categories in the medium category management table, in step 201. Then, step 202 determines whether or not the management number in the selected medium category is equal to "0". When the result in step 202 is YES, the process is returned to step 200. That is, a process for the next medium category is performed. On the other hand, when the management number is greater than "1" and the result in step 202 is NO, step 203 determines whether or not there is a small category which has not been processed yet in the selected medium category. When the result in step 203 is YES, the process in step 204 is performed. That is, the small category is selected to display the contents therein, and then the medium categories and the dictionary information in corresponding small categories are displayed on the display unit 3. When the result in step 203 is NO, the process is returned to step 200.

The medium categories and the dictionary information in corresponding small categories are, for example, displayed on the display unit 3, as shown in FIG. 8. This dictionary editor is used in the English-Japanese machine translation system so that the displayed dictionary information is information relating to Japanese equivalents corresponding to the English word "make". Referring to FIG. 8, the Japanese equivalents "FURUMAU", "MISEKAKERU", "TSUKURARERU" which belong to small categories Vi1 and Vi2 are displayed next to the corresponding medium category "verb used without a complement and an object". The Japanese equivalents "NARU", "SURU" which belong to small categories Vi3 and Vic are displayed next to the corresponding medium category "verb used with a complement and without an object". The Japanese equivalent "NARU" belongs to both small categories Vi3 and Vic. However, only one Japanese equivalent "NARU" is displayed on the display unit 3. The management numbers in the medium categories "verb used with a participle as a complement" and "verb used a clause as a complement" are equal to "0", as shown in the medium category management table shown in FIG. 5, so that Japanese equivalents corresponding to these medium categories are not displayed on the display unit 3.

It is also possible to display dictionary information other than the Japanese equivalents. For example, syntactic information on the entry and the like can be displayed on the display unit 3. It is possible to add the medium categories to the medium category management table when a small category corresponding to a medium category is selected from the small categories in the dictionary information area.

In this embodiment, the dictionary information (Japanese equivalent) belonging to the small category is not displayed when the same dictionary information (Japanese equivalent) belonging to another small category has been displayed on the display unit 3. That is, even if a plurality of small categories in the medium category respectively have the same Japanese equivalent, the number of the same equivalents displayed next to the corresponding medium category is one. Thus, it is easy for the user to look for the required Japanese equivalent.

In this embodiment, the dictionary editor forms the medium category management table as shown in FIG. 5 on the basis of the display group table as shown in FIG. 4, and then converts the dictionary information as shown in FIG. 3 into the information as shown in FIG. 8 with reference to the medium category management table. Then the contents shown in FIG. 8 are displayed on the display unit 3.

Instruction (Selecting a process in step 5 shown in FIG. 2):

The user looks at the Japanese equivalents in each medium category displayed on the display unit 3 and inputs the instruction for modifying the Japanese equivalents, adding the Japanese equivalents and so on from the input unit 6 by use of a cursor key or a mouse. In this case, for example, one or plurality of the Japanese equivalents are added into a corresponding medium category. One or plurality of the Japanese equivalents in the medium category are modified.

Figure 9:
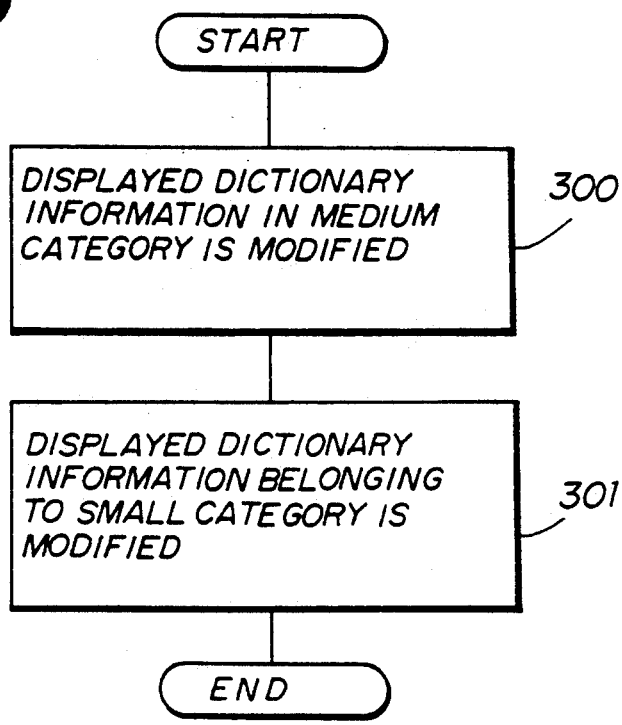

Modification of the dictionary information in the medium category (step 7 shown in FIG. 2):

The dictionary information in the medium category is modified in accordance with a process show in FIG. 9. When one or a plurality of the Japanese equivalents in the medium category displayed as shown in FIG. 8 are modified in step 300 in accordance with the user's instruction, the small categories which have the modified Japanese equivalents are searched with reference to the medium category management table as shown in FIG. 5, in step 301. Then, in all small categories having the Japanese equivalents modified by the user, the Japanese equivalents, corresponding to the Japanese equivalents modified by the user, in the dictionary information area in the memory provided in the dictionary editor are modified, in step 301. The medium category management table is modified so as to correspond to the modified contents in the dictionary information area in the memory.

Figure 10:
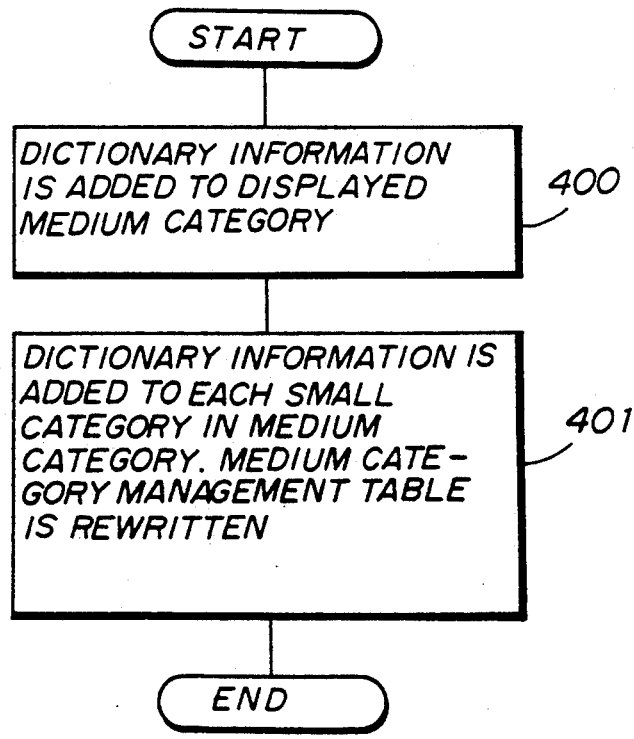

Addition of the information in the medium category (step 8 shown in FIG. 2):

FIGS. 10 and 11 show processes for adding the information in the medium category. In a process shown in FIG. 10, the Japanese equivalents are added to the medium category shown in FIG. 8 in accordance with the user's instruction, in step 400. Then, in the dictionary information area in the memory provided in the dictionary editor, the Japanese equivalents corresponding to the Japanese equivalents added to the medium category by the user are added to all the small categories belonging to the medium category, in step 401. The medium category management table is modified so as to correspond to the modified contents in the dictionary information area in the memory.

In this process, when the small categories to which the Japanese equivalents are added are provided in the display group table shown in FIG. 4 but the same small categories are not provided in the medium category management table shown in FIG. 5, the small categories can be added to a corresponding medium category in the medium category management table and a corresponding management number is modified.

In a process shown in FIG. 11, the Japanese equivalents are added to the medium category shown in FIG. 8 in accordance with the user's instruction, in step 500. Then, in the dictionary information area in the memory provided in the dictionary editor, the Japanese equivalents corresponding to the Japanese equivalents added to the medium category by the user are added to the small categories belonging to the medium category in the medium category management table, in step 501. The medium category management table is modified so as to correspond to the modified contents in the dictionary information area in the memory.

In this process, when the small categories to which the Japanese equivalents are added are provided in the display group table shown in FIG. 4 but the same small categories are not provided in the medium category management table shown in FIG. 5, the small categories are not added to the medium category management table.

In the English-Japanese machine translation system, the added Japanese equivalent can be determined as being the prior Japanese equivalent. In this case, when a new small category is added to the medium category management table, the priority of the Japanese equivalent in the added small category can be decreased.

Addition of the medium category (step 9 shown in FIG. 2):

It is also possible to register one or a plurality of new medium categories in the dictionary 1.

The new medium categories are registered in accordance with a process as shown in FIG. 12. When the medium category, Japanese equivalents and related information are input from the input unit 6 by the user, the input data is added to the dictionary information area in the memory, in step 600. Then the medium category management table as shown in FIG. 5 is rewritten in accordance with the added data, in step 601. The added medium category and the small categories belonging to the added medium category are also added to the display group table 4.

Registration process (step 10 shown in FIG. 2):

When the user inputs an instruction for registering the information, the modified information, added information which is obtained by the above processes and so on are registered in the dictionary 1. That is, the small categories and the Japanese equivalent and the related information belonging to each small category in the dictionary information area in the memory provided in the dictionary editor are registered in the dictionary 1.

The registration process can also be performed when the following ending process is performed.

Ending process (step 6 shown in FIG. 2):

When the user inputs an instruction for performing the ending process, the process for editing the dictionary is completed. When the modification of the dictionary information and so on are performed and the registration process is not performed, the dictionary editor informs the user that the registration profess is not performed yet. In this case, after the registration process is completed, the process for editing the dictionary is completed.

According to the present invention, the dictionary information corresponding to each medium categories is displayed on the display unit so that it is easy for the user to look for the dictionary information on the display unit. In addition, The present invention is not limited to the aforementioned embodiments, and variations and modifications may be made without departing from the scope of the claimed invention.

What is claimed is:

1. An apparatus for displaying dictionary information in a dictionary used in a natural language process, said dictionary having a plurality of entry words, small categories corresponding to each entry word and the dictionary information belonging to each small category, each small category being a syntactic category of a corresponding entry word, said apparatus comprising:

retrieval means for retrieving an entry word specified by a user in said dictionary and for reading out the dictionary information belonging to each small category corresponding to the retrieved entry word from said dictionary;

grouping means, responsive to the retrieved entry word retrieved by said retrieval means, for grouping the small categories corresponding to the retrieved entry word into medium categories, each medium category having one or a plurality of small categories; and display means, coupled to said grouping means, for displaying the dictionary information in the small categories grouped in each medium category.

2. An apparatus as claimed in claim 1, wherein said grouping means has a table indicating a relationship between the small categories and the medium categories, the small categories being grouped in the medium categories in accordance with said table.

3. An apparatus as claimed in claim 2, further comprising means for changing said relationship between the small categories and the medium categories in said table.

4. An apparatus as claimed in claim 1, wherein each of a plurality of medium categories form a part of speech of the entry word.

5. An apparatus as claimed in claim 1, wherein:
syntactical functions of the small categories grouped in each medium category are similar to syntactical functions of other small categories in a same medium category.

6. An apparatus as claimed in claim 1, wherein each entry word is a word in a first language and dictionary information includes an equivalent in a second language.

7. An apparatus for editing a dictionary used in a natural language process, said dictionary having a plurality of entry words, small categories corresponding to each entry word and the dictionary information belonging to each small category, each small category being a syntactic category of a corresponding entry word, said apparatus comprising:

retrieval means for retrieving the entry word specified by a user in said dictionary and for reading out the dictionary information belonging to each small category corresponding to the retrieved entry word from said dictionary;

grouping means, responsive to the retrieved entry word retrieved by said retrieval means, for grouping the small categories corresponding to the retrieved entry word into medium categories, each medium category having one or a plurality of small categories;

display means, coupled to said grouping means, for displaying the dictionary information in the small categories grouped in each medium category;

first modification means for modifying the dictionary information displayed by said display means in accordance with the user's instruction; and renewal means for renewing the dictionary information in said dictionary on the basis of the dictionary information obtained by said first modification means.

8. An apparatus as claimed in claim 7, wherein said grouping means has a table indicating a relationship between the small categories and the medium categories, the small categories being grouped in the medium categories in accordance with said table.

9. An apparatus as claimed in claim 8, further comprising means for changing said relationship between the small categories and the medium categories in said table.

10. An apparatus as claimed in claim 7, wherein each of a plurality of medium categories form a part of speech of the entry word.

11. An apparatus as claimed in claim 7, wherein syntactical functions of the small categories grouped in each medium category are similar to each other.

12. An apparatus as claimed in claim 7, wherein each entry word is a word in a first language and dictionary information includes a equivalent in a second language.

13. An apparatus as claimed in claim 7, wherein said renewal means has second modification means for modifying the dictionary information belonging to each small category grouped in the medium category corresponding to the dictionary information obtained by said first modification means.

* * * * *